United States Patent
Joze

(10) Patent No.: US 12,169,912 B2
(45) Date of Patent: Dec. 17, 2024

(54) SURFACE SPECTRAL REFLECTION ESTIMATION IN COMPUTER VISION

(71) Applicant: Microsoft Technology Licensing, LLC, Redmond, WA (US)

(72) Inventor: Hamidreza Vaezi Joze, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 578 days.

(21) Appl. No.: 17/352,469

(22) Filed: Jun. 21, 2021

(65) Prior Publication Data

US 2022/0405521 A1    Dec. 22, 2022

(51) Int. Cl.
| | |
|---|---|
| G06T 5/60 | (2024.01) |
| G06T 5/50 | (2006.01) |
| G06T 5/90 | (2024.01) |
| G06T 7/174 | (2017.01) |
| G06T 7/90 | (2017.01) |

(52) U.S. Cl.
CPC .......... *G06T 5/60* (2024.01); *G06T 5/50* (2013.01); *G06T 5/90* (2024.01); *G06T 7/174* (2017.01); *G06T 7/90* (2017.01); *G06T 2207/20081* (2013.01)

(58) Field of Classification Search
None
See application file for complete search history.

(56) References Cited

FOREIGN PATENT DOCUMENTS

CA    3090504 A1 *  2/2021   .......... G06N 3/0454

OTHER PUBLICATIONS

Arend, et al., "Simultaneous color constancy", In Journal of the Optical Society of America. A, Optics and image science, vol. 3, Issue 10, Nov. 1986, pp. 1743-1751.
Banic, et al., "Green stability assumption: Unsupervised learning for statistics-based illumination estimation", In Journal of Imaging, vol. 4, Issue 11, Oct. 29, 2018, pp. 1-11.
Banic, et al., "Unsupervised learning for color constancy", In Repository of arXiv: 1712.00436v1, Dec. 1, 2017, pp. 1-11.
Barron, et al., "Convolutional color constancy", In Proceedings of IEEE International Conference on Computer Vision, Dec. 7, 2015, pp. 379-387.
Bianco, et al., "Automatic color constancy algorithm selection and combination", In Journal of Pattern Recognition, vol. 43, Issue 3, Mar. 2010, pp. 695-705.
Bianco, et al., "Improving color constancy using indoor-outdoor image classification", In Journal of IEEE Transactions on Image Processing, vol. 17, Issue 12, Dec. 2008, pp. 2381-2392.

(Continued)

*Primary Examiner* — Bernard Krasnic

(57) ABSTRACT

An image processor receives first image data representing an image. The first image data comprising a plurality of color values corresponding to a plurality of pixels in the image. The image processor determines, using a trained machine learning model, second image data based on the first image data. The second image data comprises surface spectral reflection values corresponding to the plurality of pixels in the image, where the surface spectral reflection values are distributed across a plurality of wavelengths of visible light in the image. The image processor then performs at least one image processing operation with respect to the image using the second image data.

17 Claims, 8 Drawing Sheets

(56) References Cited

OTHER PUBLICATIONS

Bianco, et al., "Quasi-unsupervised color constancy", In Proceedings of IEEE/CVF Conference on Computer Vision and Pattern Recognition, Jun. 15, 2019, pp. 12212-12221.
Blasinski, et al., "Designing illuminant spectral power distributions for surface classification", In Proceedings of IEEE Conference on Computer Vision and Pattern Recognition, Jul. 21, 2017, pp. 2682-2691.
Buchsbaum, G., "A spatial processor model for object colour perception", Journal of the Franklin Institute, vol. 310, Issue 1, Jul. 1980, pp. 1-26.
Chakrabarti, et al., "Color constancy beyond bags of pixels", In Proceedings of IEEE Conference on Computer Vision and Pattern Recognition, Jun. 23, 2008, 6 Pages.
Chakrabarti, et al., "Color Constancy with Spatio-Spectral Statistics", In Journal of IEEE Transactions on Pattern Analysis and Machine Intelligence, vol. 34, Issue 8, Aug. 2012, pp. 1509-1519.
Cheng, et al., "Illuminant estimation for color constancy: why spatial-domain methods work and the role of the color distribution", In Journal of the Optical Society of America A, vol. 31, Issue 5, Mar. 22, 2014, pp. 1049-1058.
Delahunt, et al., "Does human color constancy incorporate the statistical regularity of natural daylight?", In Journal of Vision, vol. 4, Issue 2, Feb. 2004, pp. 57-81.
Dicarlo, et al., "Illuminating illumination", In Proceedings of 9th Color Imaging Conference: Color Science and Engineering: Systems, Technologies, Applications, Nov. 6, 2001, pp. 27-34.
Dorr, et al., "The goldfish-a colour-constant animal", In Journal of Perception, vol. 25, Issue 2, Feb. 1, 1996, pp. 243-250.
Dzhafarli, et al., "Antelidze. Color constancy in monkeys", In Journal of Sensory Systems, vol. 5, Issue 3, Jul. 1991, pp. 200-204.
Finlayson, et al., "4-sensor camera calibration for image representation invariant to shading, shadows, lighting, and specularities", In Proceedings of 8th IEEE International Conference on Computer Vision, Jul. 7, 2001, pp. 473-480.
Finlayson, et al., "Color Constancy: Generalized Diagonal Transforms Suffice", In Journal of the Optical Society of America A, vol. 11, Issue 11, Nov. 1994, pp. 3011-3019.
Finlayson, et al., "Colour by correlation: A simple, unifying approach to colour constancy", In Proceedings of the 7th EEE International Conference on Computer Vision, Sep. 20, 1999, pp. 835-842.
Finlayson, et al., "Colour constancy at a pixel", In the Journal of the Optical Society of America A, vol. 18, Issue 2, Feb. 2001, pp. 253-264.
Forsyth, D.A., "A novel approach to color constancy", In Proceedings 2nd International Conference on Computer Vision, Dec. 5, 1988, pp. 9-18.
Funt, et al., "Diagonal versus affine transformations for color correction", In Journal of the Optical Society of America A, vol. 17, Issue 11, Nov. 2000, pp. 2108-2112.
Gehler, et al., "Bayesian Color Constancy Revisited", In Proceedings of IEEE Conference on Computer Vision and Pattern Recognition, Jun. 23, 2008, 8 Pages.
Gijsenij, et al., "Color constancy using natural image statistics and scene semantics", In Journal IEEE Transactions on Pattern Analysis and Machine Intelligence, vol. 33, Issue 4, Apr. 8, 2010, pp. 687-698.
Gijsenij, et al., "Generalized gamut mapping using image derivative structures for color constancy", In International Journal of Computer Vision, vol. 86, Issue 2-3, Feb. 11, 2008, pp. 127-139.
He, et al., "Deep Residual Learning for Image Recognition", In Proceedings of the IEEE Conference on Computer Vision and Pattern Recognition, Jun. 27, 2016, pp. 770-778.
Jordley, et al., "Reevaluation of color constancy algorithm performance", In Journal of the Optical Society of America A, vol. 23, Issue 5, Jun. 2006, pp. 1008-1020.

Hu, et al., "Fc4: Fully convolutional color constancy with confidence-weighted pooling", In Proceedings of the IEEE Conference on Computer Vision and Pattern Recognition, Jul. 21, 2017, pp. 4085-4094.
Ji, et al., "Max margin cosine loss for speaker identification on short utterances", In Proceedings of 11th International Symposium on Chinese Spoken Language Processing, Nov. 26, 2018, pp. 304-308.
Jiang, et al., "What is the space of spectral sensitivity functions for digital color cameras?", In Proceedings of IEEE Workshop on Applications of Computer Vision, Jan. 15, 2013, 12 Pages.
Joze, et al., "Exemplar-based color constancy and multiple illumination", In Journal of IEEE Transactions on Pattern Analysis and Machine Intelligence, vol. 36, Issue 5, May 2014, pp. 860-873.
Joze, et al., "Exemplar-based colour constancy", In Proceedings of British Machine Vision Conference 2012, Jan. 2012, 12 Pages.
Joze, et al., "Troncoso Rey. The role of bright pixels in illumination estimation", In Proceedings of 20th Color and Imaging Conference, Jan. 2012, 6 Pages.
Joze, et al., "White patch gamut mapping colour constancy", In Proceedings of 19th IEEE International Conference on Image Processing, Sep. 30, 2012, pp. 801-804.
Land, "The retinex theory of color vision", In Journal of Scientific American, vol. 237, Issue 6, Dec. 1977, pp. 108-129.
Li, et al., "Colour constancy based on texture similarity for natural images", In Journal of Coloration Technology, vol. 125, Issue 6, Dec. 10, 2009, pp. 328-333.
Liu, et al., "Discriminative illumination: Perpixel classification of raw materials based on optimal projections of spectral ordf", In Proceedings of IEEE Conference on Computer Vision and Pattern Recognition, Jun. 11, 2013, pp. 86-99.
Martinkauppi, et al., "Face Colour Under Varying Illumination: Analysis and Applications", In Thesis of Doctoral Dissertation, Oulu University, Aug. 30, 2002, 117 Pages.
Rosenberg, et al., "Bayesian color constancy with non-Gaussian models", In Proceedings of the 16th International Conference on Neural Information Processing Systems, Dec. 2003, 8 Pages.
Shafer, Steven A., "Using color to separate reflection components", In Journal of Color Research and Applications, vol. 10, Issue 4, Winter 1985, pp. 210-218.
Shi, et al., "Deep Specialized Network for Illuminant Estimation", In Proceedings of European Conference on Computer Vision, Oct. 2016, pp. 371-387.
Shi, et al., "Re-processed version of the gehler color constancy dataset of 568 images, 2010", Retrieved From: https://www2.cs.sfu.ca/~colour/data/shi_gehler/, 2010, 3 Pages.
Storring, et al., "Skin colour detection under changing lighting conditions", In Proceedings of 7th Symposium on Intelligent Robotics Systems, Jul. 20, 1999, pp. 1-9.
Vorobyev, et al., "Colourful objects through animal eyes", In Journal of Color Research & Application, vol. 26, Issue S1, Jan. 2001, pp. 214-217.
Wang, et al., "Cosface: Large Margin Cosine Loss for Deep Face Recognition", In Proceedings of the IEEE Conference on Computer Vision and Pattern Recognition, Jun. 18, 2018, pp. 5265-5274.
Weijer, et al., "Edge-based color constancy", In Proceedings of IEEE Transactions on Image Processing, vol. 16, Issue 9, Sep. 2007, pp. 2207-2214.
West, et al., "Necessary and sufficient conditions for von kries chromatic adaptation to give color constancy", In Journal of Mathematical Biology, vol. 15, Issue 2, Oct. 1982, pp. 249-258.
Wu, et al., "Color constancy based on texture pyramid matching and regularized local regression", In Journal of the Optical Society of America A, vol. 27, Issue 10, Oct. 1, 2010, pp. 2097-2105.
Xiong, et al., "Estimating illumination chromaticity via support vector regression", In Journal of Imaging Science and Technology, vol. 50, Issue 4, Jul. 2006, pp. 341-348.
Afifi, et al., "Sensor-Independent Illumination Estimation for DNN Models", In Repository of arXiv:1912.06888v1, Dec. 14, 2019, pp. 1-13.
Gu, et al., "Efficient Estimation of Reflectance Parameters From Imaging Spectroscopy", In Journal of IEEE Transactions on Image Processing, vol. 22, Issue 9, Sep. 2013, pp. 3648-3663.

(56) References Cited

OTHER PUBLICATIONS

Nguyen, et al., "Training-Based Spectral Reconstruction from a Single RGB Image", In proceedings of European Conference on Computer Vision, Sep. 6, 2014, pp. 186-201.

"International Search Report and Written Opinion Issued in PCT Application No. PCT/US22/029083", Mailed Date: Aug. 16, 2022, 12 Pages.

\* cited by examiner

SURFACE SPECTRAL REFLECTION ESTIMATION IN COMPUTER VISION

BACKGROUND

Color constancy is the ability to perceive the color of an object irrespective of conditions of illumination of the object. As an example, human color perception systems ensure that a yellow banana is perceived as yellow under varying light conditions, such as under white light, red sunset light, indoor fluorescent light, etc. In computer vision, images are typically represented by per-pixel color values, such as per-pixel red, green and blue (RGB) values representing a scene in the image. Image representation by color values is a simplification of actual physical light components that may be seen by a camera that captured the image. Color constancy in images is typically approximated by estimating the color of light in the image based on RGB values representing the scene in the image and applying a transform, such as the von Kries Model diagonal transformation, to remove the effects of illumination from the image. Such techniques rely on various further simplifications and/or assumptions about spectral light illumination and spectral reflection in an image. For example, such techniques generally ignore specular reflection effects in an image and assume uniform illumination in the image. Such simplifications and assumptions pose limitations and result in poor performance in various image processing applications, such as in image color correction applications, image segmentation applications, object recognition applications, etc.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure are directed to improving image processing in computer vision applications.

In an aspect, a method for processing images is provided. The method includes receiving first image data representing an image, the first image data comprising a plurality of color values corresponding to a plurality of pixels in the image. The method also includes determining, using a machine learning model, second image data based on the first image data, the second image data including surface spectral reflection values corresponding to the plurality of pixels in the image, the surface spectral reflection values distributed across a plurality of wavelengths of visible light in the image. The method additionally includes performing, using the second image data, at least one image processing operation with respect to the image.

In another aspect, a system is provided. The system includes one or more computer readable storage media, and program instructions stored on the one or more computer readable storage media that, when executed by at least one processor, cause the at least one processor to perform operations. The operations includes receiving a plurality of training images and training a machine learning model, based on the plurality of training images, to determine, based on image data corresponding to an arbitrary image, surface spectral reflection values distributed across a plurality of wavelengths of visible light in the arbitrary image. The operations also include receiving first image data representing an image, the first image data comprising a plurality of color values corresponding to a plurality of pixels in the image. The operations additionally include determining, using the machine learning model, second image data based on the first image data, the second image data comprising surface spectral reflection values corresponding to the plurality of pixels in the image, the surface spectral reflection values distributed across a plurality of wavelengths of visible light in the image. The operations further include storing the second image data in a memory for subsequent processing of the image.

In yet another aspect, a computer storage medium is provided. The computer storage medium stores computer-executable instructions that, when executed by at least one processor, cause a computer system to perform operations. The operations include receiving first image data representing an image, the first image data comprising a plurality of color values corresponding to a plurality of pixels in the image. The operations also include determining, using a machine learning model, second image data from the first image data, the second image data comprising surface spectral reflection values corresponding to the plurality of pixels in the image, the surface spectral reflection values distributed across a plurality of wavelengths of visible light in the image. The operations also include performing, using the second image data, at least one image processing operation with respect to the image.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific aspects or examples. These aspects may be combined, other aspects may be utilized, and structural changes may be made without departing from the present disclosure. Aspects disclosed herein may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In accordance with examples of the present disclosure, an image processing system comprises a surface spectral reflection estimator configured to estimate per-pixel surface spectral reflection values for a plurality of pixels of an image. In an aspect, the surface spectral reflection estimator may comprise a machine learning model, such as a neural network, that may be trained on a set of real training images to perform per-pixel spectral reflection estimation on an arbitrary image. The surface spectral reflection estimator may receive, as input, a color representation of an image of a scene, such as read greed and blue (RGB) color vectors corresponding to pixels of the image of the scene. The surface spectral reflection estimator may process the color representation of the image of the scene to estimate a full spectral light distribution as a function of wavelength of light in the scene and may recover per-pixel surface spectral reflection values corresponding to pixels of the image of the scene. The per-pixel surface spectral reflection representation may be utilized to enhance further processing that may be performed with respect to the image. For example, in aspects, the per-pixel surface spectral reflection values may be utilized to perform image color correction, image segmentation, object recognition, image synthesis, etc. in connection with the image. In aspects, using per-pixel surface spectral reflection values to perform processing operations with respect to the image allows the image processing system to preserve color constancy in the image. In at least some aspects, because per-pixel surface spectral reflection values more accurately represent physical perception as compared to a simplified color representation (e.g., RGB representation) of an image, using estimated per-pixel surface spectral reflection value for image processing of an image may enhance image processing performance and may allow for applications that may not be possible in systems that rely on color representation of an image without estimating pixel-level surface spectral reflection values for the image.

Figure 1:
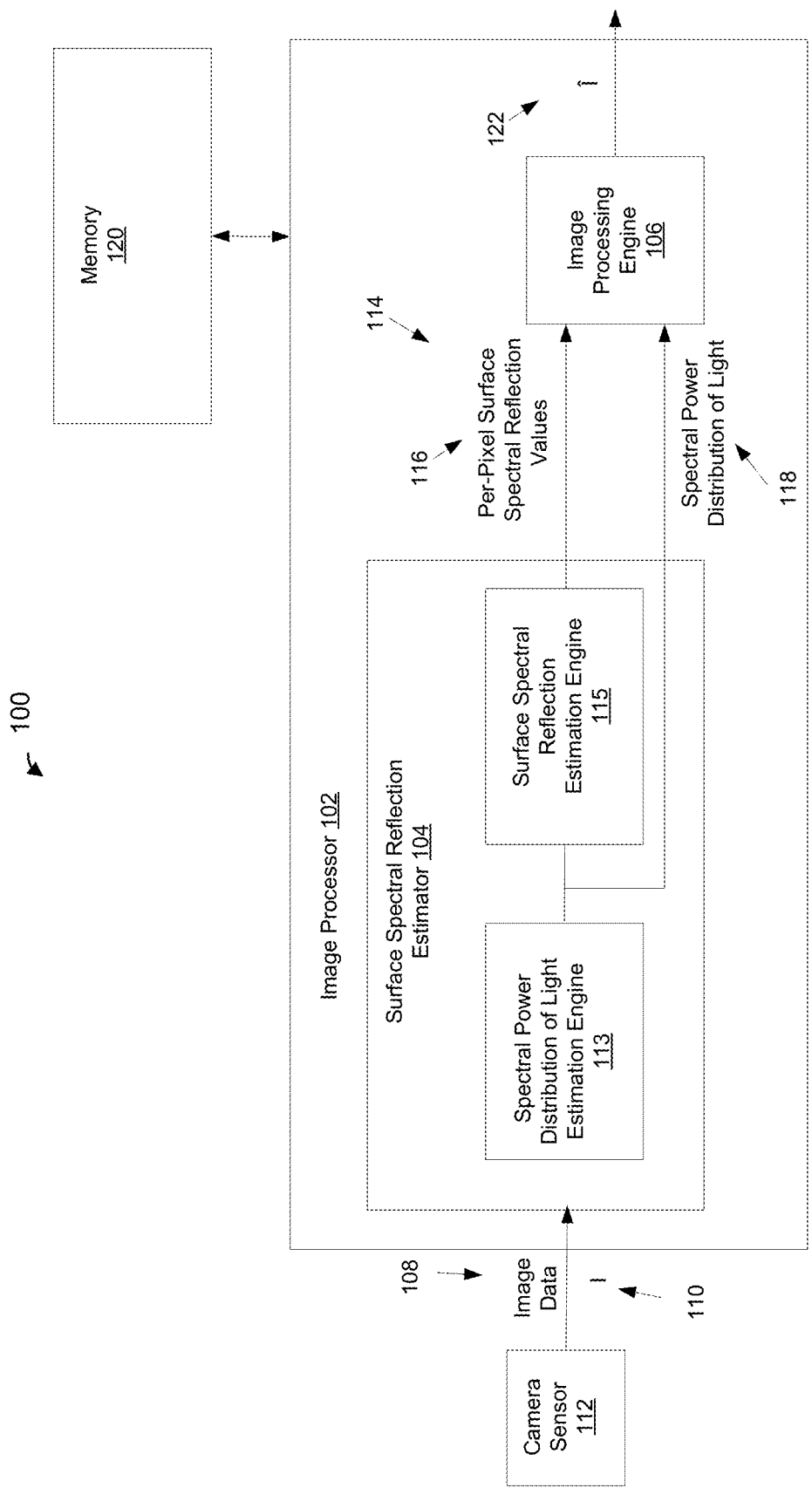
FIG. 1 is a block diagram of an example surface spectral reflection estimation engine, in accordance with an aspects of the present disclosure.

FIG. 1 illustrates an overview of an example image processing system 100 in which per-pixel surface spectral reflection values may be obtained from an image, in accordance with aspects of the present disclosure. The image processing system 100 may include an image processor 102 which may, in turn, include a surface spectral reflection estimator 104 and an image processing engine 106. The surface spectral reflection estimator 104 may be configured to receive, as an input, image data 108 representing an image I 110 obtained by a camera sensor 112. The image I 110 may comprise an image, a video frame, a stream of video frames, etc. The camera sensor 112 may be part of a digital camera device, a computing device (e.g. a personal computer), a laptop device, a smart phone device, etc. The camera sensor 112 is illustrated in FIG. 1 as being directly coupled to the image processor 102 and the surface spectral reflection estimator 104. The camera sensor 112 may be, for example, included in a device that also the image processor 102 and/or the surface spectral reflection estimator 104. In other aspects, the camera sensor 112 may be included in, or may otherwise provide image data to, a device that is communicatively coupled to the image processor 102 and/or the surface spectral reflection estimator 104 via a communication network. For example, the image processor 102 and/or the surface spectral reflection estimator 104 may be provided as a cloud service that may be accessible via a communication network.

With continued reference to FIG. 1, the camera sensor 112 may be, for example, a multichannel camera sensor (e.g., an RGB camera sensor), a single channel camera sensor (e.g., an infrared camera sensor), or another suitable type of camera sensor. The camera sensor 112 may generally be configured to capture light in a scene and convert the light into image data 108, such as RGB vector values corresponding to pixels of an image of the scene. The surface spectral reflection estimator 104 may process the image data 108 corresponding to the image I 110, and may determine output image data 114 based on the image data 108 corresponding to the image I 110. The surface spectral reflection estimator 104 may include a spectral power distribution of light estimation engine 113 configured to estimate a spectral power distribution of light in the scene depicted in the image I 110 and a surface spectral reflection estimation engine 115 configured to estimate per-pixel surface spectral reflection in the scene depicted in the image I 110. The output image data 114 may include per-pixel surface spectral reflection values 116, corresponding to the scene depicted in the image I 110, estimated as a function of wavelength of light in the image I 110 that may be captured by the camera sensor 112. In some aspects, the output image data 114 may additionally include spectral power distribution of light 118, in the scene depicted in the image I 110 as a function of wavelength of light that may be captured by the camera sensor 112.

In some aspects, the surface spectral reflection estimator 104 may additionally or alternatively provide the output image data 114 (e.g., the per-pixel surface spectral reflection values 116 and/or the spectral power distribution of light 118) to the image processing engine 106. The image processing engine 106 may be configured to perform one or more processing operations with respect to the image I 110 based on the output image data 114. For example, the image processing engine 106 may use the surface spectral reflection values 116 to generate an image $\hat{I}$ 122. In an aspect, the image $\hat{I}$ 122 may be a synthesized image that includes one or more objects from the image I 110. In this aspect, the image processing engine 106 may utilize surface spectral reflection values 116 corresponding to the pixels that include the one or more objects in the image I 110 in synthesizing the image $\hat{I}$ 122. In another aspect, the image $\hat{I}$ 122 may be an enhanced or modified version of the image I 110. For example, the image $\hat{I}$ 122 may correspond to the image I 110 to which the image processing engine 106 has applied a target light, such as a blue lite, a purple light, a canonical light, etc. In an aspect, the image processing engine 106 may be configured to apply a target light to the image I 110 by retrieving, e.g., from a memory 120 that may be coupled to the image processor 102, power spectral distribution values corresponding to the target light, and multiplying the per-pixel surface spectral reflection values 116 corresponding to the image I 110 by the power spectral distribution of the target light. In other aspects, the image processing engine 106 may be configured to perform other suitable operations with respect to the image I 110 based on the surface spectral reflection values 116. In aspects, because the image processing engine 106 may utilize the surface spectral reflection values 116 to perform the processing operations with respect to the image I 110, the image processing engine 106 may maintain color constancy of various objects in the image I 110. Thus, for example, the image processing engine 106 may apply a target light to the image I 110 while maintaining colors of one or more objects in the scene captured in the image I 110 at least substantially the same as in the image I 110. In other aspects, the image processing engine 116 may perform other suitable image processing operations based on the output image data 114 (e.g., the per-pixel surface spectral reflection values 116 and/or the spectral power distribution of light 118).

In some aspects, the image processor 102 may be configured to store the output image data 114 (e.g., the per-pixel surface spectral reflection values 116 and/or the spectral power distribution of light 118), e.g., in the memory 120, for subsequent processing that may be performed in connection with the image 110; such subsequent processing may include one or more of the processing operations discussed in connection with the image processing engine 116 and/or may include other suitable image processing operations not discussed in connection with the image processing engine 116.

In some aspects, the per-pixel surface spectral reflection values 116 and the spectral power distribution of light 118 may be estimated across a plurality of discrete wavelengths of light (e.g., a plurality of wavelengths in the 400 nm to 700 nm visible light range) that may be captured by the camera sensor 112. For example, N discrete wavelengths of light may be utilized. In this example, the per-pixel surface spectral reflection values 116 may comprise a set of vectors, each vector i) corresponding to a particular pixel in the image and ii) including N surface spectral reflection values corresponding to respective wavelengths of light in the image. Further, the spectral power distribution of light 118 may comprise a single vector including N values representing power of light at respective wavelengths of light in the image. In an example aspect, N is 64. In other aspects, other suitable number of discrete wavelengths (e.g., 16, 128, etc.) may be utilized.

In an aspect, the surface spectral reflection estimator 104 may be trained, or otherwise configured, to process images based on an image formation model, such as dichromatic reflection model that models reflection of light from physical objects that may be captured in a scene. According to the dichromatic reflection model, light reflected from a material is a combination of the light reflected at the surface of the material and the light reflected from the material body. Based in the dichromatic reflection model, an image captured by a camera may be represented as $$I_k = m_b(\Theta)\int S(\lambda)E(\lambda)Q_k(\lambda)d\lambda + m_s(\Theta)\int E(\lambda)Q_k(\lambda)d\lambda \quad \text{Equation 1}$$

where $k \in \{r,g,b\}$, $E(\lambda)$ is the spectral power distribution of light in the image, $S(\lambda)$ is the surface spectral reflection, and $Q_k(\lambda)$ is spectral sensitivity representing a camera that captured the image. Equation 1 may be rewritten as $$I_k = m_b(\Theta)b_k + m_s(\Theta)e_k \quad \text{Equation 2}$$

where $m_b(\Theta)$ and $m_s(\Theta)$ are geometric scale factors of, respectively, body reflection and surface reflection. In accordance with equations 1 and 2, the color of pixels of a uniformly-colored patch of an object in the image is a linear combination of the surface body reflection color $b=(b_1,b_2,b_3)^T$ and interface reflection $e=(e_1,e_2,e_3)^T$. Thus, in this model, color variation within a uniform object area depends only on the geometric scale factors $m_b(\Theta)$ and $m_s(\Theta)$, while the surface and interface reflection colors b and e are constant color three-dimensional vectors.

The dichromatic reflection model may also be expressed as a special case of a bidirectional reflectance distribution function (BRDF) model. According to the BRDF model, the bidirectional reflectance distribution function $f(\lambda,\Theta)$ is a four-dimensional function that defines how light reflects from an opaque surface. The bidirectional reflectance distribution function takes an incoming light and outgoing direction, both defined with respect to surface normal axis n̂, and returns the ratio of reflected radiance exiting in the outgoing direction to the irradiance incident on the surface from the incoming direction. Each direction may be parametrized by an azimuth angle and a zenith angle, resulting in the four dimensions of the bidirectional reflectance distribution function.

In some aspects, the image formation model used for training of the surface spectral reflection estimator 104 may be simplified based on one or more assumption and/or simplifications. For example, a Lambertian model that ignores body reflection may be utilized. As another example, theoretical infinitely narrowband camera sensor assumption may be made. Under this assumption, camera sensors may be modeled as being sensitive at discrete wavelength of light. Such assumptions and simplifications may allow for efficient training of the surface spectral reflection estimator 104 while still producing a model that performs sufficiently accurate estimation of per-pixel surface spectral reflection values corresponding to a scene depicted in an image and/or the spectral power distribution of light in the image.

In some aspects, the surface spectral reflection estimator 104 may be targeted to the particular type of the camera sensor 112, such to a brand, a model, etc. of the camera sensor 112 (e.g., a Microsoft Surface Duo camera, Cannon 5D camera, iPhone 11 camera, iPhone 12 camera, etc.). For example, the surface spectral reflection estimator 104 may comprise a machine learning model, such as a neural network, that is trained based on characteristics of the particular camera sensor 112. The machine training model may be trained, for example, using one or more camera spectral sensitivity functions that are specific to the particular type of the camera sensor 112. Thus, in aspects, a surface spectral reflection estimator used for processing images captured by a first camera sensor may be different from a surface spectral reflection estimator used for processing images captured by a second camera sensor that is different from the first camera sensor. In other aspects, the surface spectral reflection estimator 104 may be generally trained, such as trained using one or more general camera spectral sensitivity functions that are not specific to the particular type of the camera sensor 112.

Figure 2:
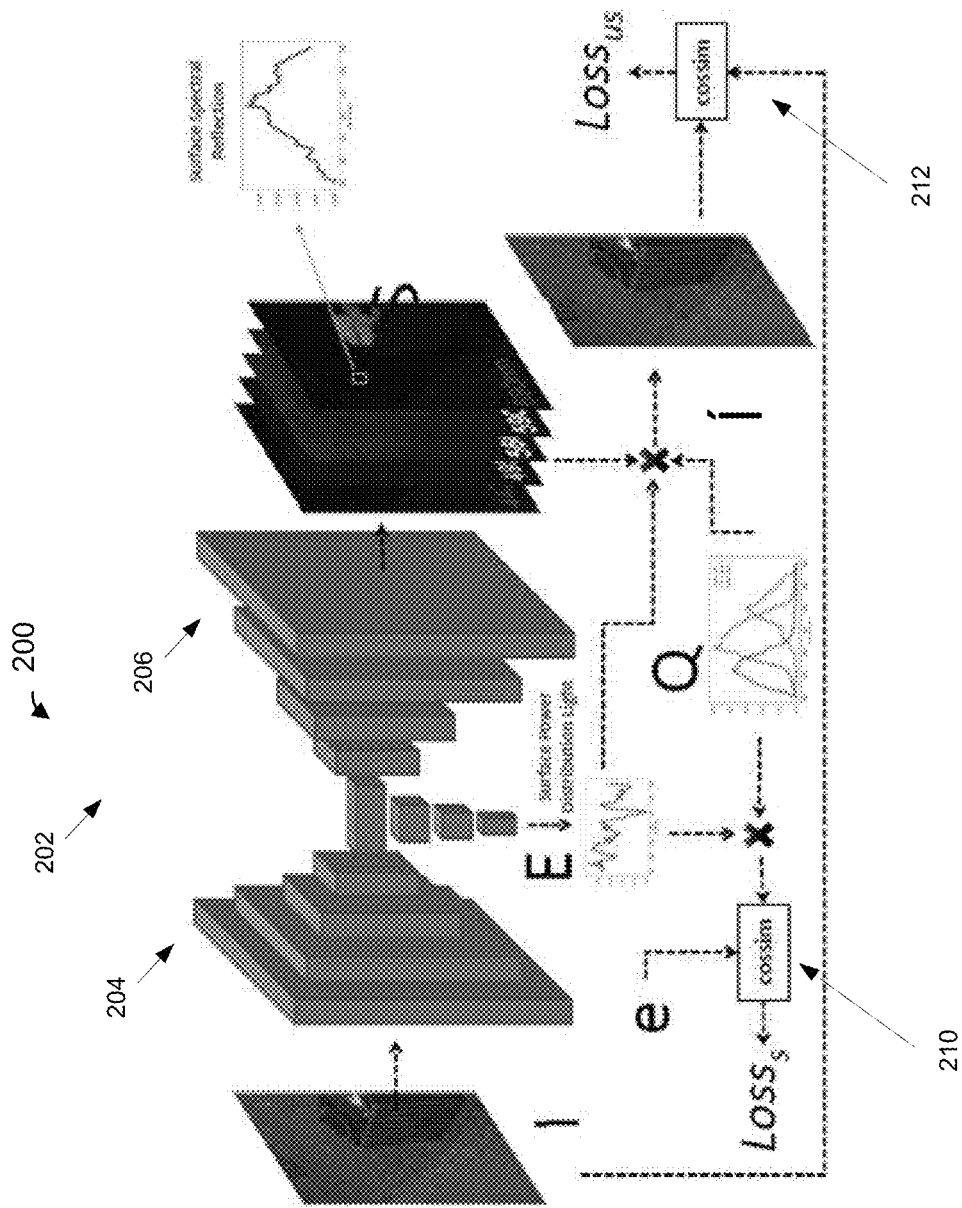
FIG. 2 is a block diagram depicting an example implementation of the surface spectral reflection estimation engine of FIG. 1, in accordance with aspects of the present disclosure.

Referring to FIG. 2, a model 200 may correspond to the surface spectral reflection estimator 104 of FIG. 1, in accordance with aspects of the present disclosure. The model 200 may be configured to, for an arbitrary image capturing a scene, recover i) a global vector E comprising an estimate of the spectral power distribution of light in the scene and ii) a plurality of per-pixel vectors S comprising per-pixel estimates of surface spectral reflection in the scene. In an aspect, the model 200 comprises a neural network 202, such as a convolutional neural network. In another aspect, the model 200 may additionally or alternatively include a machine learning model other than a convolutional neural network.

In an aspect, the model 200 is based on Lambertian model using discrete vectors $E_{1...N}$ and $S_{1...N}$ representing, respectively, normalized spectral power distribution of light and normalized surface spectral reflection of a pixel x in an image. In an aspect, discrete vectors $E_{1...N}$ and $S_{1...N}$ represent uniform sub-sampling of, respectively, normalized spectral power distribution of light and normalized surface spectral reflection at wavelength in the visible light at N discrete wavelengths in the range of 400 nm to 700 nm. In an example aspect, N is 64. In other aspects, other suitable number of wavelengths (e.g., 16, 128, etc.) may be utilized. With discrete sampling, equations 1 and 2 may be rewritten as $$I_k = C_s \Sigma_{i=1}^N S_i E_i Q_i^k = C_s(S \times E) \cdot Q^k \qquad \text{Equation 3}$$

and $$e_k = C_e \Sigma_{i=1}^N E_i Q_i^k = C_e E \cdot Q^k \qquad \text{Equation 4}$$

where $k \in \{r,g,b\}$, $C_s$ and $C_e$ are singular coefficient constants. In particular, $C_s$ may be a singular coefficient determined by the absolute value of spectral power distribution of light, the absolute vale of surface spectral reflection and the product of $m_b(\Theta)b_k$. Further, $C_e$ may be a singular coefficient determined by only the absolute value of spectral power distribution of light.

Figure 3:
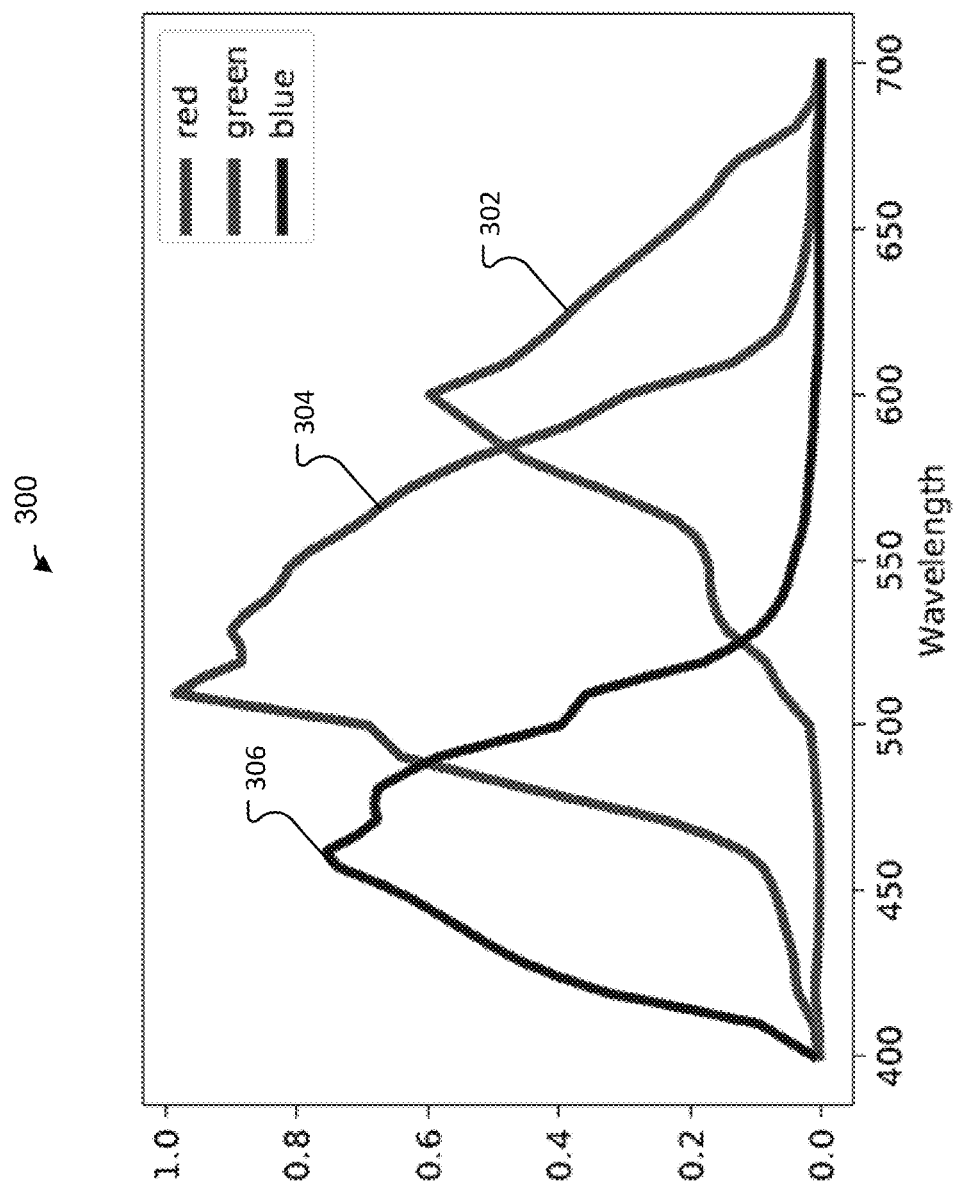
FIG. 3 illustrates example measured camera spectral sensitivity functions used in training of the surface spectral reflection estimation engine of FIG. 1, in accordance with aspects of the present disclosure.

In aspects, the neural network 202 may be modeled based on equations 3 and 4. In aspects, the neural network 202 may be trained using generic camera spectral sensitivity functions $Q^k$, or respective neural networks 202 may be trained using camera-specific spectral sensitivity functions $Q^k$ for use with respective cameras of specific brands, models, etc. Referring briefly to FIG. 3, example camera spectral sensitivity functions 300 may be utilized to train the neural network 202, in accordance with aspects of the present disclosure. The camera spectral sensitivity functions 300 generally determine red, green and blue color values of pixels in a scene based on the radiance measured by a camera sensor capturing an image of the scene. The camera spectral sensitivity functions 300 may include a camera spectral sensitivity function 302 that determines a red color value based on the radiance measured by the camera sensor capturing the image of the scene, a camera spectral sensitivity function 304 that determines a green light value based on the radiance measured by the camera sensor capturing the image of the scene and a camera spectral sensitivity function 304 that determines a blue light value based on the radiance measured by the camera sensor capturing the image of the scene. In an aspect, the camera spectral sensitivity functions 300 may be generic camera spectral sensitivity functions that are not associated with a particular camera type, a particular camera brand, etc. In another aspect, the camera spectral sensitivity functions 300 may correspond to a particular camera type, a particular camera brand, etc. (e.g., a Microsoft Surface Duo camera, Cannon 5D camera, iPhone 11 camera, iPhone 12 camera, etc.).

Referring back to FIG. 2, the neural network 202 may comprise a first stage 204 that may be trained to obtain the global vector E comprising an estimate of the spectral power distribution of light in the scene and a second stage 206 that may obtain the plurality of per-pixel vectors S comprising per-pixel estimates of surface spectral reflection in the scene. The neural network 202 may be trained, using end-to-end training based on a plurality of training images, to train the first stage 204 to determine the global vector E for an arbitrary image and to determine the plurality of per-pixel vectors S for the arbitrary image. In aspects, the neural network 202 may be trained using a first loss function 210 and a second loss function 212. The first loss function 210 may be configured to minimize an error in estimation of the spectral power distribution of light based on training images that may be associated with a known estimate of the spectral power distribution of light. In an aspect, the training images may be labeled with a previously estimated spectral power distribution of light. For example, training images may be obtained from an image dataset that includes labels spectral power distribution of light. As another example, in another aspect, the model 200 may include a pre-processing stage (not shown in FIG. 2) that may utilize a suitable technique to perform on-the-fly estimation of the spectral power distribution of light in training images. The loss function 210 may determine a loss $Loss_s$ based on a comparison between the known or pre-determined spectral power distribution of light in a training image and a multiplication product of i) an estimation of the spectral power distribution of light in the training image obtained from the first stage 204 of the neural network 202 and ii) a camera spectral sensitivity function being used to train the neural network 202. The second loss function 212 may be configured to minimize an error in estimation of the per-pixel surface spectral reflection function based on the training images. The second loss function 212 may determine a loss $Loss_{us}$ based on a comparison between the training image and a product of i) an estimation of the spectral power distribution of light in the training image obtained from the first stage 204 of the neural network 202, ii) a camera spectral sensitivity function being used to train the neural network 202 and iii) an estimation of the per-pixel surface spectral reflection function obtained from the second stage 206 of the neural network 202.

In some aspects, one or both of the first loss function 210 and the second loss function 212 may be configured to determine the corresponding loss based on cosine similarity. Generally, cosine similarity between two vectors A and B is defined as:

$$\cos sim(u, v) = \frac{A \cdot B}{|A||B|} \qquad \text{Equation 5}$$

Accordingly, the cosine similarity between two vectors is the cosine of the angle between the two vectors. As can be seen from equation 5, cosine similarity takes into account absolute values of magnitudes of the two vectors. Thus, for example, the first loss function 210 may take into account the absolute values of the magnitudes of pre-determined spectral power distribution of light in a training image and a multiplication product of i) the estimation of the spectral power distribution of light in the training image obtained from the first stage 204 of the neural network 202 and ii) the camera spectral sensitivity function being used to train the neural network 202. Similarly, the second loss function 212 may take into account magnitudes of the color vectors representing the training image and the product of i) the estimation of the spectral power distribution of light in the training image obtained from the first stage 204 of the neural network 202, ii) the camera spectral sensitivity function being used to train the neural network 202 and iii) the estimation of the per-pixel surface spectral reflection function obtained from the second stage 206 of the neural network 202.

In an aspect, the first loss function 210 may be defined as $$L_s = 1 - \cos sim\left(e, \begin{pmatrix} E \cdot Q^R \\ E \cdot Q^G \\ E \cdot Q^B \end{pmatrix}\right) \qquad \text{Equation 6}$$

where e may represent spectral power distribution of light in a training image. In an aspect, the training images may be labeled with a previously determined ground truth power distribution of light e. In this aspect, because the first loss function 210 is based on the ground truth values of the spectral power distribution of light e in a training image, the first loss function 210 may correspond to supervised training stage of the neural network 202. In another aspect, values of the spectral power distribution of light e in a training image may be determined on-the-fly prior to the image being provided to the neural network 202. In this aspect, because the first loss function 210 is based on on-the-fly estimation of the spectral power distribution of light e in a training image, without prior knowledge of the spectral power distribution of light e in the training image, the first loss function 210 may correspond to unsupervised training stage of the neural network 202.

Turning now to the second loss function 212, in an aspect, the second loss function 212 may be based on per-pixel loss defined as $$L^x = 1 - \cos sim\left(I^x, \begin{pmatrix} (S^x \times E) \cdot Q^R \\ (S^x \times E) \cdot Q^G \\ (S^x \times E) \cdot Q^B \end{pmatrix}\right)$$

Equation 7 where the superscript x identifies a pixel in the training image. Based on equation 7, the second loss function 212 may be defined as $$L_{us} = \sum_{x \in \Theta} \frac{L^x}{|\Theta|}$$

Equation 8

Generally, because no prior-knowledge about the image is used to define the second loss function 212, the second loss function 212 corresponds to unsupervised training of the neural network 202. Thus, in aspects, either semi-supervised training or unsupervised training may be utilized to train the neural network 202. With semi-supervised training, the first loss function 210 corresponds to supervised training that utilizes labels associated with training images and the second loss function 212 corresponds to unsupervised training that does not utilize any prior knowledge about the test images. On the other hand, with unsupervised learning, both the first loss function 210 and the second loss function 212 are defined without use of any prior knowledge about the test images.

In an aspect, $\Theta$ in equation 8 may be defined as a set of pixels for which equations 3 and 4 hold true. In other words, in an aspect, the set $\Theta$ may include all pixels for which the illuminant E has a suitably low (e.g., minimal) amount of spectral reflection according to the Lambertian model. In an aspect, to ensure that equations 3 and 4 hold true for pixels included in the set $\Theta$, the model 200 is configured to exclude, from the set $\Theta$, pixels having specular reflection and shadow characteristics because the emitted light corresponding to such pixels may not satisfy the conditions for the illuminant E. In an aspect, the model 200 is configured to exclude, from the set $\Theta$, a subset of pixels having highest estimated specular reflection values (e.g., brightest pixels) and/or a subset of pixels having lowest estimated specular reflection values (e.g., shadow pixels). As an example, the model 200 is configured to exclude, from the set $\Theta$, a subset of pixels corresponding to highest one percent (1%) estimated specular reflection values and/or a subset of pixels corresponding to the bottom ten percent (10%) estimated specular reflection values.

Figure 4:
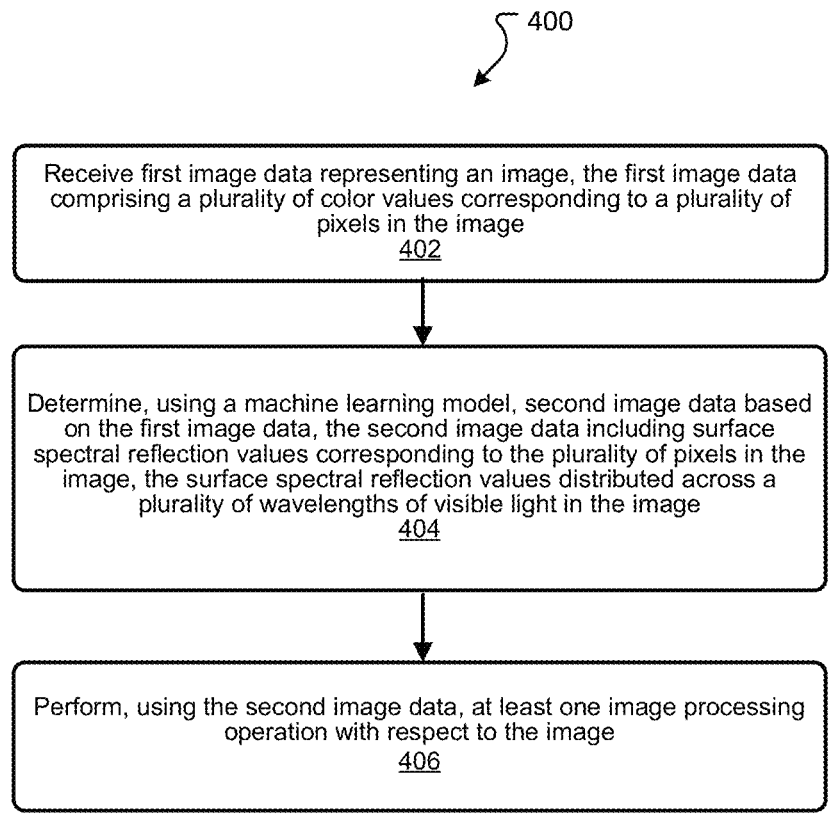
FIG. 4 depicts details of a method for processing an image, in accordance with aspects of the present disclosure.

FIG. 4 depicts details of a method 400 for processing image data, in accordance with aspects of the present disclosure. A general order for the steps of the method 400 is shown in FIG. 4. The method 600 can be executed as a set of computer-executable instructions executed by a computer system and encoded or stored on a computer readable medium. Further, the method 400 can be performed by gates or circuits associated with a processor, Application Specific Integrated Circuit (ASIC), a field programmable gate array (FPGA), a system on chip (SOC), or other hardware device. Hereinafter, the method 400 shall be explained with reference to the systems, components, modules, software, data structures, user interfaces, etc. described in conjunction with FIGS. 1-3.

At block 402, first image data representing an image is received. In an aspect, the first image data is received by the surface spectral reflection estimator 104 of FIG. 1. In another aspect, the first image data is received by a suitable surface spectral reflection estimator different from the suitable surface spectral reflection estimator 104 of FIG. 1. In an aspect, the first image data comprises a plurality of color values corresponding to a plurality of pixels in the image. For example, the first image data comprises respective RGB vectors corresponding to respective ones of the plurality of pixels in the image. In other aspects, the first image data comprises image data in other suitable formats.

At block 404, a machine learning model is used to determine second image data based on the first image data received at block 402. In an aspect, the model 200 (e.g., the neural network 202) of FIG. 2 is used to determine second image data based on the first image data received at block 402. In another aspect, a suitable machine learning model different from the model 200 of FIG. 2 is utilized to determine second image data based on the first image data received at block 402. In an aspect, the second image data includes surface spectral reflection values corresponding to the plurality of pixels in the image, where the surface spectral reflection values are distributed across a plurality of wavelengths of visible light in the image. In some aspects, the second image data additionally includes spectral distribution of light in the scene depicted in the image.

At block 406, the second image data determined at block 404 is used to perform at least one image processing operation with respect to the image. For example, the second image data determined at block 404 may be used to perform one or more of i) apply color correction on the image using the surface spectral reflection values to identify one or more objects in the image, ii) apply a target light to the image at least by multiplying the surface spectral reflection values by a spectral power distribution corresponding to the target light and iii) perform image segmentation using the surface spectral reflection values to identify one or more objects in the image. In other aspects, the second image data determined at block 404 may be additionally or alternatively used to perform other suitable operations, such as image processing and/or image synthesis operations, in connection with the image.

Figure 5:
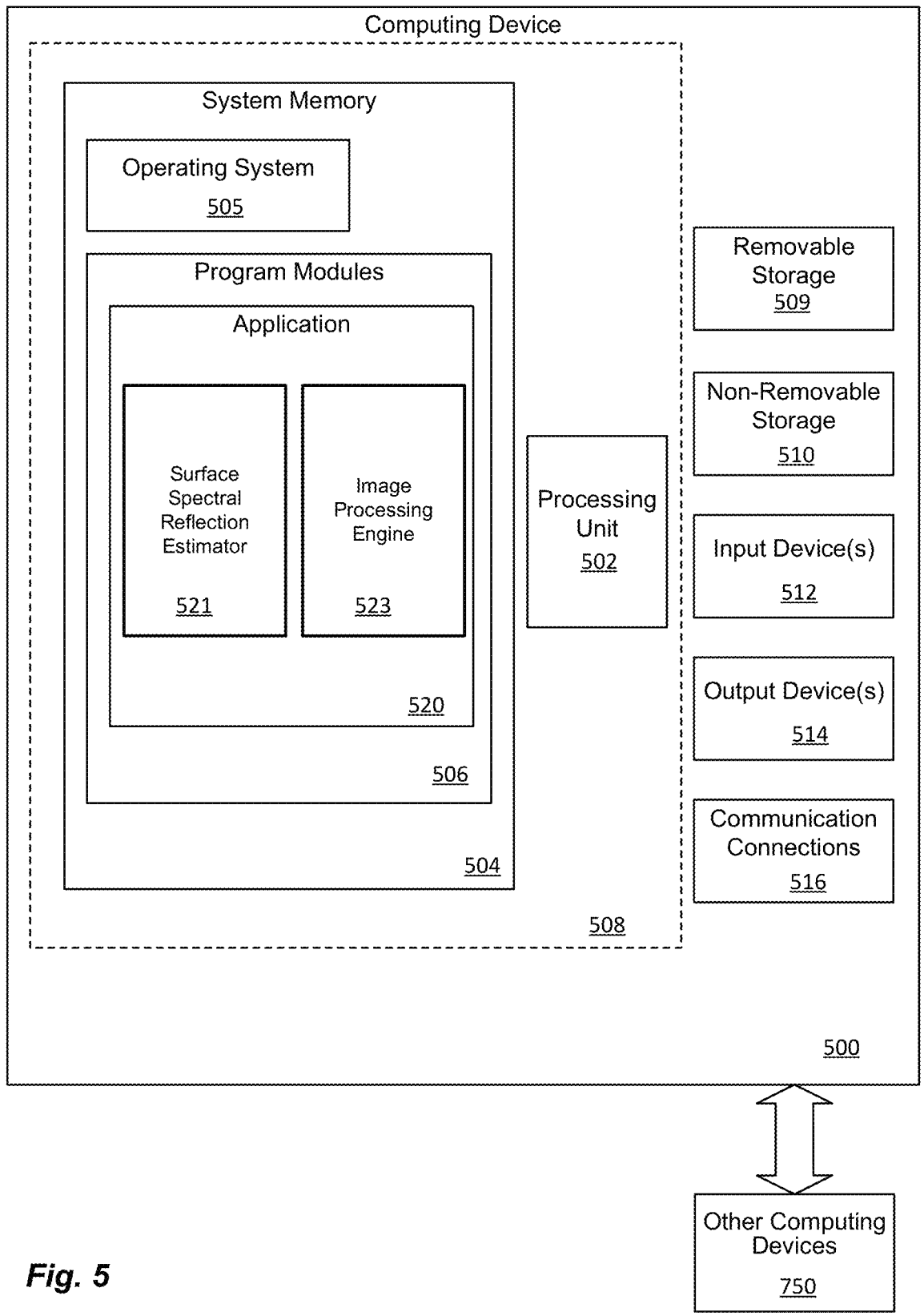
FIG. 5 is a block diagram illustrating physical components (e.g., hardware) of a computing device with which aspects of the disclosure may be practiced.
Figure 6A:
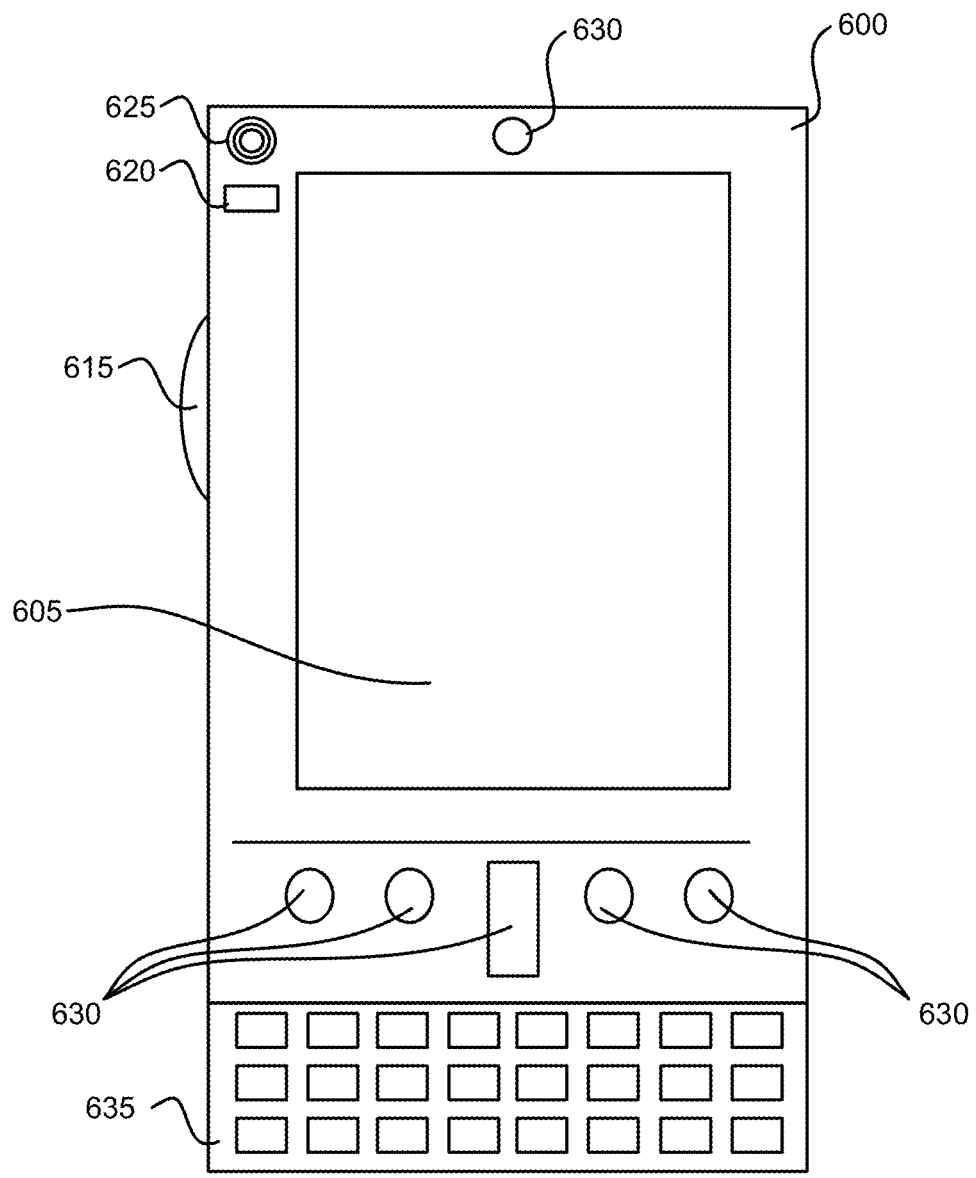
FIGS. 6A-6B illustrate a mobile computing device with which aspects of the disclosure may be practiced.
Figure 6B:
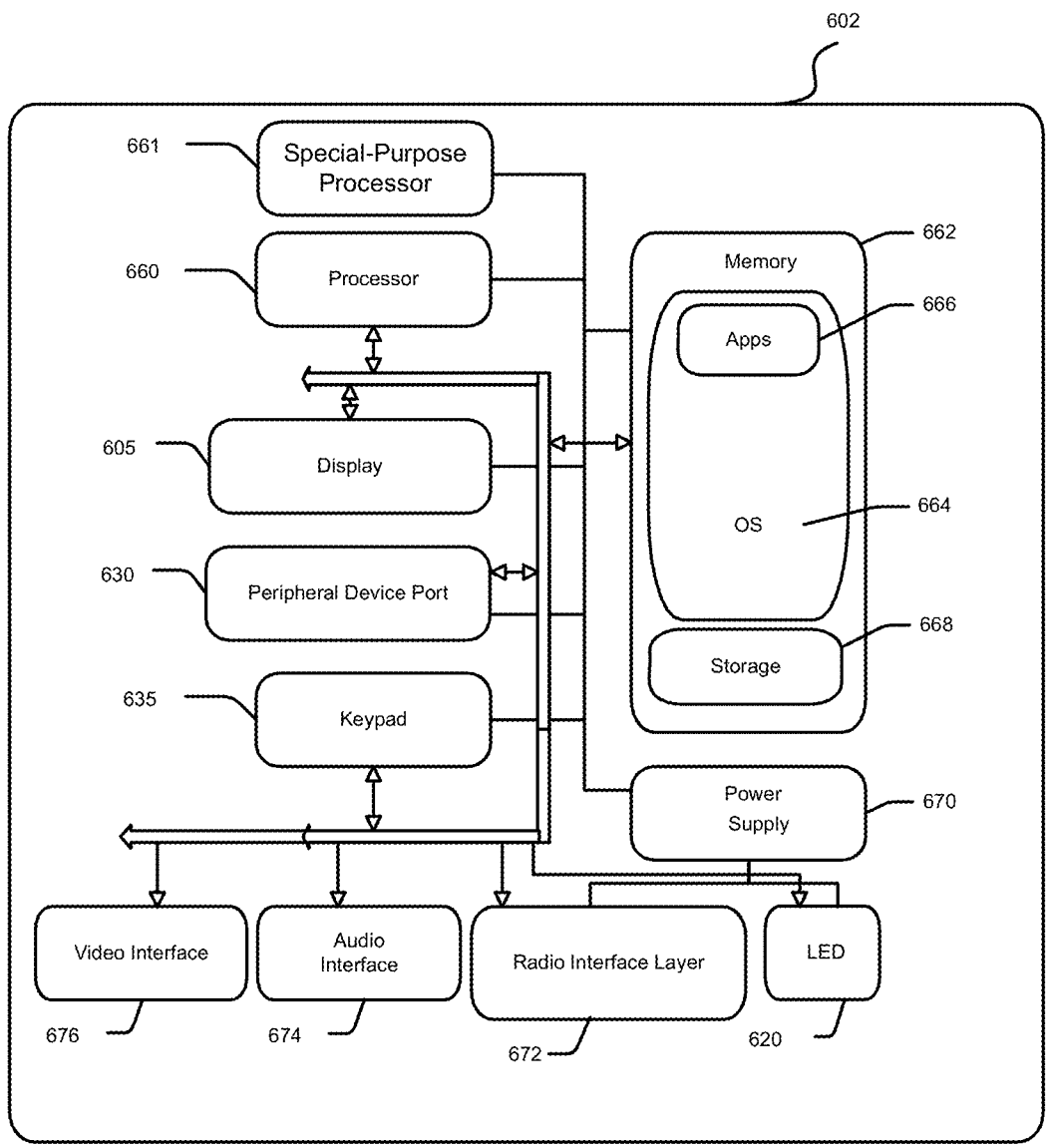
Figure 7:
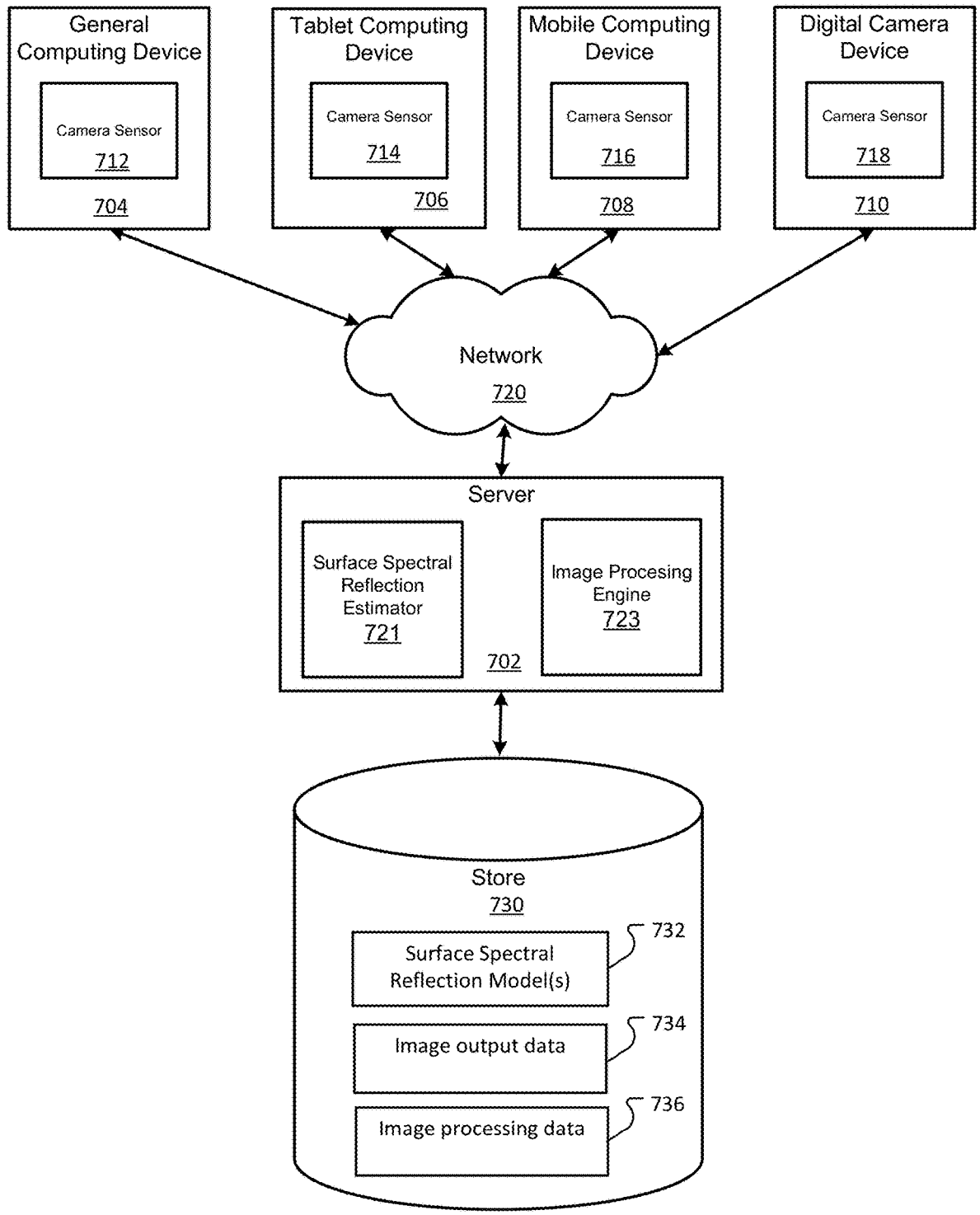
FIG. 7 illustrates at least one aspect of an architecture of a system for processing data in accordance with examples of the present disclosure.

FIGS. 5-7 and the associated descriptions provide a discussion of a variety of operating environments in which aspects of the disclosure may be practiced. However, the devices and systems illustrated and discussed with respect to FIGS. 5-7 are for purposes of example and illustration and are not limiting of a vast number of computing device configurations that may be utilized for practicing aspects of the disclosure, described herein.

FIG. 5 is a block diagram illustrating physical components (e.g., hardware) of a computing device 500 with which aspects of the disclosure may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may store one or more of a surface spectral reflection estimator 521 (e.g., corresponding to the surface spectral reflection estimator 104 of FIG. 1) and an image processing engine 523 (e.g., corresponding to the image processing engine 106 of FIG. 1). The operating system 505, for example, may be suitable for controlling the operation of the computing device 500.

Furthermore, aspects of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the at least one processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A-6B illustrate a mobile computing device 600, for example, a mobile telephone, a smart phone, wearable computer (such as a smart watch), a tablet computer, a laptop computer, and the like, with which aspects of the disclosure may be practiced. In some aspects, an image processing system (e.g., the image processing system 100) may at least partially included in and/or integrated with a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external source.

FIG. 6B is a block diagram illustrating the architecture of one aspect of computing device, a server, or a mobile computing device. That is, the computing device 600 can incorporate a system (e.g., an architecture) 602 to implement some aspects. The system 602 can implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated configuration, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with aspects of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

FIG. 7 illustrates one aspect of the architecture of a system for processing data received at a computing system from a remote source, such as a personal computer 704, tablet computing device 706, a mobile computing device 708, or a digital camera device 710, as described above. Content displayed at server device 702 may be stored in different communication channels or other storage types. Each of the personal computer 704, the tablet computing device 706, the mobile computing device 708, or a digital camera device 710 may comprise a respective camera sensor 712, 714, 716, 718 configured to capture image data and, in some aspects, provide the image data to the server device 702 via a network 720.

In some aspects, one or both of a surface spectral reflection estimator 721 (e.g., corresponding to the surface spectral reflection estimator 104 of FIG. 1) and an image processing engine 723 (e.g., corresponding to the image processing engine 106 of FIG. 1) may be employed by a client that communicates with server device 702, and/or the surface spectral reflection estimator 721 and/or the image processing engine 723 may be employed by server device 702. The server device 702 may provide data to and from a client computing device such as the personal computer 704, the tablet computing device 706, the mobile computing device 708 (e.g., a smart phone) and/or the digital camera device 710 through the network 720. By way of example, the computer system described above may be embodied in the personal computer 704, the tablet computing device 706, the mobile computing device 708 (e.g., a smart phone) and/or the digital camera device 710. Any of these examples of the computing devices may obtain content from the store 730, in addition to receiving graphical data useable to be either pre-processed at a graphic-originating system, or post-processed at a receiving computing system. The store 730 may include for example, surface spectral reflection model(s) store 732 that may store parameters of one or more surface spectral reflection model(s), image output data store 734 that may store image data output generated in accordance with the surface spectral reflection model(s) and/or image processing data (e.g., target light power spectral distribution data, etc.), that may be used for further processing of the output image data, for example.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method for processing images, the method comprising:
receiving first image data representing an image, the first image data comprising a plurality of color values corresponding to a plurality of pixels in the image;
determining, using a machine learning model trained for a type of a camera sensor having a camera spectral sensitivity function, second image data based on the first image data, the second image data including a spectral power distribution of light in the image and surface spectral reflection values corresponding to the plurality of pixels in the image, wherein the spectral power distribution of light and the surface spectral reflection values are estimated, using the machine learning model, as a function of wavelength of visible light in the image captured by the camera sensor and the camera spectral sensitivity function; and
performing, using the second image data, at least one image processing operation with respect to the image.

2. The method of claim 1, wherein
receiving the first image data comprises receiving respective sets of red, green and blue values corresponding to respective pixels in the image, and
determining the second image data comprises converting the red, green and blue values corresponding to respective pixels in the image to per-pixel surface spectral reflection values distributed across a plurality of wavelengths of visible light in the image.

3. The method of claim 1, wherein performing the at least one image processing operation with respect to the image comprises performing color correction on the image using the surface spectral reflection values across a plurality of wavelengths of visible light.

4. The method of claim 1, wherein performing the at least one image processing operation with respect to the image comprises applying a target light to the image at least by multiplying the surface spectral reflection values by a spectral power distribution corresponding to the target light to be applied to the image.

5. The method of claim 1, wherein performing the at least one image processing operation with respect to the image comprises using the surface spectral reflection values to perform image segmentation to identify one or more objects in the image.

6. The method of claim 1, further comprising, prior to receiving the first image data:
receiving a plurality of training images, and
training the machine learning model based on the plurality of training images, including i) using a first loss function to train the machine learning model to estimate spectral power distribution of light across a plurality of wavelengths of visible light and ii) using a second loss function to train the machine learning model to estimate the surface spectral reflection values distributed across the plurality of wavelengths of visible light.

7. The method of claim 6, wherein the first loss function is configured to minimize error based on a cosine similarity between i) the estimated spectral power distribution of light in the image multiplied by a camera spectral sensitivity function and ii) a ground truth spectral power distribution of light in the image.

8. The method of claim 6, wherein the second loss function is configured to minimize error based on a cosine similarity between i) the received color values corresponding to a plurality of pixels in the image and ii) corresponding computed color values, the computed color values determined as a multiplication between i) the estimated spectral power distribution of light, ii) the camera spectral sensitivity function and iii) the surface spectral reflection values distributed across the plurality of wavelengths of visible light.

9. The method of claim 1, wherein
receiving the first image data comprises receiving the first image data obtained from a camera of a particular camera type, and
determining, using the machine learning model, second image data based on the first image data comprises determining the second image data using a machine learning model trained with a camera spectral sensitivity function corresponding to the particular camera type.

10. A system comprising:
   at least one processor;
   one or more computer readable storage media; and
   program instructions stored on the one or more computer readable storage media that, when executed by the at least one processor, cause the at least one processor to:
      receive first image data representing an image, the first image data comprising a plurality of color values corresponding to a plurality of pixels in the image,
      determine, using a machine learning model trained for a type of a camera sensor having a camera spectral sensitivity function, second image data based on the first image data, the second image data comprising a spectral power distribution of light in the image and surface spectral reflection values corresponding to the plurality of pixels in the image, wherein the spectral power distribution of light and the surface spectral reflection values are estimated, using the machine learning model, as a function of wavelength of visible light in the image captured by the camera sensor and the camera spectral sensitivity function, and
      perform, using the second image data, at least one image processing operation with respect to the image.

11. The system of claim 10, wherein the program instructions, when executed by the at least one processor, cause the at least one processor to
   receive a plurality of training images, and
   train the machine learning model based on the plurality of training images, including i) using a first loss function to train the machine learning model to estimate spectral power distribution of light across a plurality of wavelengths of visible light in a training image and ii) using a second loss function to train the machine learning model to estimate surface spectral reflection values distributed across the plurality of wavelengths of visible light in the training image.

12. The system of claim 10, wherein the program instructions, when executed by the at least one processor, further cause the at least one processor to apply color correction to the image using the surface spectral reflection values across a plurality of wavelengths of visible light in the image.

13. The system of claim 10, wherein the program instructions, when executed by the at least one processor, further cause the at least one processor to apply a target light to the image at least by multiplying the surface spectral reflection values by a spectral power distribution corresponding to the target light to be applied to the image.

14. The system of claim 10, wherein the program instructions, when executed by the at least one processor, further cause the at least one processor to perform, using the surface spectral reflection values, image segmentation to identify one or more objects in the image.

15. A computer storage media storing computer-executable instructions that when executed by at least one processor cause a computer system to:
   receive first image data representing an image, the first image data comprising a plurality of color values corresponding to a plurality of pixels in the image;
   determine, using a machine learning model trained for a type of a camera sensor having a camera spectral sensitivity function, second image data from the first image data, the second image data comprising a spectral power distribution of light in the image and surface spectral reflection values corresponding to the plurality of pixels in the image, wherein the spectral power distribution of light and the surface spectral reflection values are estimated, using the machine learning model, as a function of wavelength of visible light in the image captured by the camera sensor and the camera spectral sensitivity function; and
   perform, using the second image data, at least one image processing operation with respect to the image.

16. The computer storage media of claim 15, wherein the plurality of color values comprise red, green, and blue values, and wherein the instructions, when executed by the at least one processor, cause the computer system to
   convert the red, green and blue values corresponding to respective pixels in the image to per-pixel surface spectral reflection values distributed across a plurality of wavelengths of visible light in the image.

17. The computer storage media of claim 15, wherein the instructions, when executed by the at least one processor, cause the computer system to, using the surface spectral reflection values across a plurality of wavelengths of visible light, perform one or more of i) apply color correction on the image using the surface spectral reflection values to identify one or more objects in the image, ii) apply a target light to the image at least by multiplying the surface spectral reflection values by a spectral power distribution corresponding to the target light and iii) perform image segmentation using the surface spectral reflection values to identify one or more objects in the image.

* * * * *